United States Patent [19]

Tanikawa et al.

[11] Patent Number: 5,016,165
[45] Date of Patent: May 14, 1991

[54] DIRECT MEMORY ACCESS CONTROLLED SYSTEM

[75] Inventors: Akinao Tanikawa, Yokohama; Toshiharu Ohshima, Kawasaki; Toshihiro Sakai, Yokohama, all of Japan

[73] Assignee: Fujitsu Limited, Kawasaki, Japan

[21] Appl. No.: 142,949

[22] Filed: Jan. 12, 1988

[30] Foreign Application Priority Data

Jan. 12, 1987 [JP] Japan .................. 62-004664

[51] Int. Cl.⁵ .............................................. G06F 13/00
[52] U.S. Cl. ................... 364/200; 364/242.3; 364/242.32; 364/242.6; 364/242.8
[58] Field of Search ... 364/900 MS File, 200 MS File, 364/200, 900

[56] References Cited

U.S. PATENT DOCUMENTS 4,502,117 2/1985 Kihara ............................ 364/200
4,688,166 8/1987 Schneider ...................... 364/200

FOREIGN PATENT DOCUMENTS 58-217034 12/1983 Japan ............................ 364/200
59-27334 2/1984 Japan ............................ 364/200
60-222951 11/1985 Japan .
61-251951 11/1986 Japan .

OTHER PUBLICATIONS

An Introduction to Microcomputers, Adam Osborne, 1980, pp. 5-67 to 5-88.

Primary Examiner—Gareth D. Shaw
Assistant Examiner—John C. Loomis
Attorney, Agent, or Firm—Staas & Halsey

[57] ABSTRACT

A direct memory access (DMA) controlled system which performs DMA data transfer between a main memory, a cache memory, and disk memories while exchanging DMA transfer requests and acknowledgements among disk control units, a memory-to-memory transfer control unit, and a common DMA control unit. The data transfer speed between the main memory and the cache memory is variable according to the load condition of the DMA control unit for the disk memories, enabling the transfer capability of the DMA control unit to be kept at a continually high level.

14 Claims, 10 Drawing Sheets

DIRECT MEMORY ACCESS CONTROLLED SYSTEM

BACKGROUND OF THE INVENTION

1. Field of the Invention

The present invention relates to a system controlled by a direct memory access (hereinafter referred to as DMA) method.

A DMA control unit is used in a computer system to reduce the load on a central processing unit (CPU) by transferring data between a main memory and submemory and transferring data between a submemory and an auxiliary memory. The "main memory" refers to the system memory which performs data communication with the CPU and is also called the main storage. The "submemory" is the memory which performs data communication with the main memory and, for example, corresponds to a so-called disk cache memory. Further, the "auxiliary memory" is an external memory which, for example, corresponds to a disk memory. Usually, a plurality of disk memories are provided. Disk memories, i.e., auxiliary memories, are connected to the DMA control unit through auxiliary memory control units, i.e., disk control units, provided corresponding to the same. Similarly, the disk cache memory is connected to the DMA control unit through a memory-to-memory transfer control unit. In this case, the total of the sum ($CP_{dk}$) of the data transfer capacities of the respective disk control units and the data transfer capacity ($CP_{mm}$) of the memory-to-memory transfer control unit ($CP+CP_{mm}$) must be smaller than the data transfer capacity ($CP_{dma}$) of the DMA control unit, i.e., $CP_{dk}+CP_{mm} \leq CP_{dma}$. If the inequality symbol (<) becomes opposite, the DMA control unit would become inoperative due to insufficient capacity. In this case, it would be possible to increase the data transfer capacity of the DMA control unit to make up for the insufficient capacity but this would require an increase in the amount of hardware in the DMA control unit and would not be advantageous from an economic viewpoint.

2. Description of the Related Art

As described later in detail in conventional DMA control units, a status of the subchannel (control information for each of the above DMA control units) is not known. Therefore, even when the number of data transfer requests becomes a maximum, a certain restriction is applied so that the data transfer capability ($CP_{dma}$) of the DMA control unit is not exceeded. This restriction means that the data transfer capacity of the memory-to-memory transfer control unit is always kept at a constant level (for example, 1 Mbyte).

Therefore, when one of two disk control units does not issue a data transfer request to the DMA control unit, that is, when there is a margin in the capacity of the DMA control unit, despite it being possible to increase the data transfer capacity of the memory-to-memory control unit by an amount corresponding to the margin, the data transfer capacity of the memory-to-memory transfer control unit remains restricted to the set level (for example, 1 Mbyte). Therefore, in a conventional DMA controlled system, there is the disadvantage of a deteriorated data transfer efficiency.

SUMMARY OF THE INVENTION

The present invention has as an object the provision of a DMA controlled system where the data transfer efficiency in a DMA mode is improved to the theoretically maximum attainable level.

To achieve the above-mentioned object, the present invention recognizes the following fact. When there is a margin in the data processing capability of a DMA control unit, the data transfer speed between a submemory and main memory may be made faster. Conversely, when there is no margin in the data processing capability of a DMA control unit, it may be made slower. Taking this into consideration, the memory-to-memory transfer control unit may be constructed so the memory-to-memory data transfer speed is automatically changeable in accordance with the load condition of the DMA control unit.

BRIEF DESCRIPTION OF THE DRAWINGS

The above-mentioned object and features of the present invention will become clearer with the following explanation made with reference to the appended drawings, in which.

DESCRIPTION OF THE PREFERRED EMBODIMENTS

To facilitate understanding of the present invention and before explaining the construction of the present invention, a description will be given of the conventional DMA control system.

Figure 1:
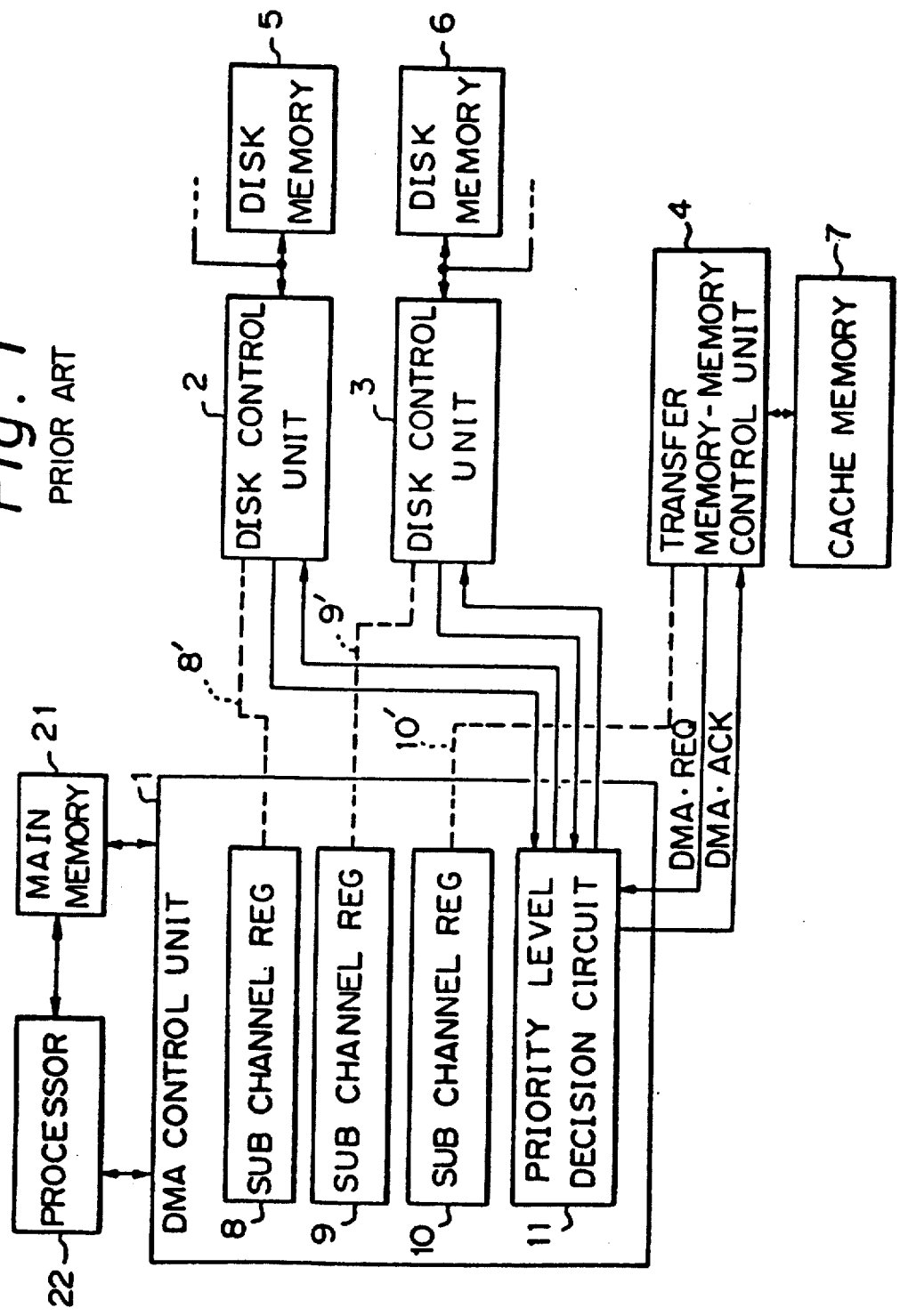
FIG. 1 is a block diagram showing the schematic construction of a conventional DMA controlled system.

FIG. 1 is a block diagram showing the schematic construction of a conventional DMA controlled system. In FIG. 1, the DMA control unit 1 is connected to and operates with auxiliary control units, i.e., disk control units 2 and 3 and also the memory-to-memory transfer control unit 4. The disk control units 2 and 3 have cooperating with them respectively at least one auxiliary memory, i.e., disk memory. Further, the memory-to-memory transfer control unit 4 has cooperating with it a submemory, i.e., cache memory 7.

The disk control units 2 and 3 and the memory-to-memory transfer control unit 4 issue, to a priority level decision circuit 11, in the DMA control unit 1 a signal requesting from the DMA control unit 1, data transfer control, i.e., a DMA request signal DMA REQ. When acknowledgement of this request, i.e., a DMA acknowledge signal DMA ACK, is received, the disk control unit 2 cooperates with a sub channel register (REG) 8 (shown schematically by broken line 8') to execute the data transfer. Similarly, the disk control unit 3 cooperates with a subchannel register (REG) 9 (9') and the memory-to-memory transfer control unit 4 cooperates with a subchannel register (REG) 10 (10') to execute the respective data transfers. In this case, if, for example, the data transfer capability of the DMA control unit 1 is 6 Mbyte, the data transfer capability of the disk control units 2 and 3 is respectively 2.5 Mbyte, and the data transfer capability of the memory-to-memory transfer control unit 4 is a maximum 2.5 Mbyte, and the total of the data transfer capability of the control units 2, 3, and 4, i.e., 7.5 Mbyte, would exceed the data processing capability or transfer capacity (6 Mbyte) of the DNA control unit 1.

To prevent this overload from occurring, conventionally the data transfer capability of the memory-to-memory transfer control unit 4 has been fixed at a certain level (according to the above example, 1 (=6−2.5×2) Mbyte). This may be achieved by hardware or software.

However, as mentioned earlier, if the data transfer capability of the memory-to-memory transfer control unit 4 is fixed at a certain level at all times, the data transfer efficiency of the DMA controlled system deteriorates and, as a result, the data processing speed of the system is reduced.

Next, an explanation will be made of the DMA controlled system of the present invention.

Figure 2:
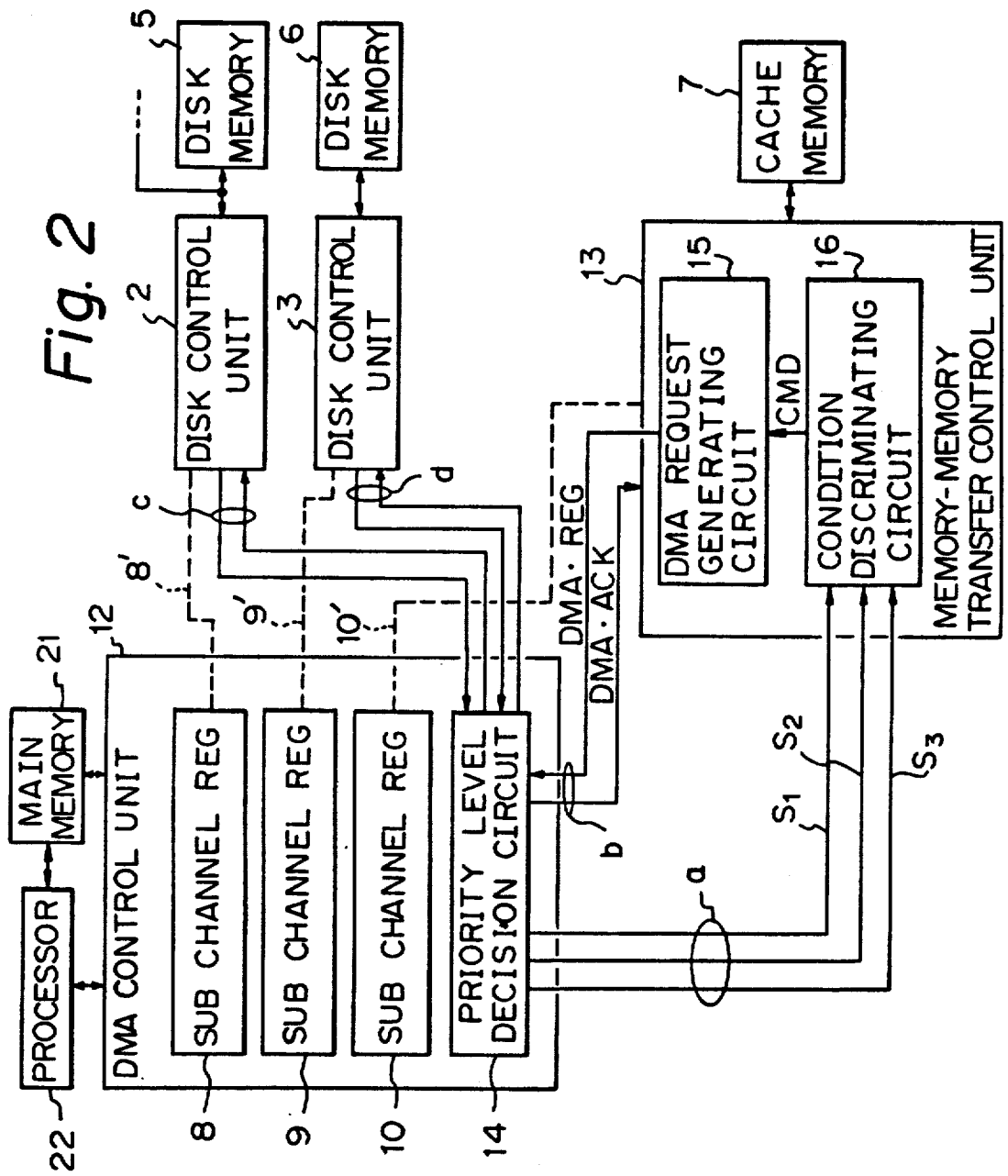
FIG. 2 is a block diagram showing the principle of the DMA controlled system of the present invention.

FIG. 2 is a block diagram showing the principle of the DMA controlled system of the present invention. To make the explanation easier to understand, we assume the data transfer capabilities to be as follows, for example:

| | |
|---|---|
| DMA control unit 12: | 6 Mbyte |
| Disk control unit 2: | 2.5 Mbyte |
| Disk control unit 3: | 2.5 Mbyte |
| Memory-to-memory transfer control unit 13: | Max. 4 Mbyte |

Here, we assume the disk control units 2 and 3 and the memory-to-memory transfer control unit 13 have issued a DMA request signal to the priority level decision circuit 14 of the DMA control unit 12. That is, when operating at maximum capacity (4 Mbyte) the unit 13 issues DMA requests at a normal rate with a normal interval in between the requests. The priority level decision circuit 14 accepts the DMA request from the unit with the highest priority (in this case, we assume the priority of the disk control units 2 and 3 is higher than the priority of the memory-to-memory transfer control unit 13) and applies a DMA start signal $S_1$ to a condition discriminating circuit 16 in the memory-to-memory transfer control unit 13. Soon after this, the condition discriminating circuit 16 returns a DMA acknowledge (ACK) signal DMA ACK to the disk control units 2 and 3 during the transfer of data.

Further, the priority level decision circuit 4 applies control information for the subchannel registers 8 and 9 upon application of the DMA start signal and a memory identification (ID) signal $S_2$ during the execution of the data transfer to the condition discriminating circuit 16. When the DMA acknowledge signal (DMA ACK) is received, it is determined from the ID signal $S_2$ that the disk control unit 2 or 3 has begun a data transfer and a command is issued to the DMA request generating circuit 15 to reduce the data transfer speed.

The DMA request generating circuit 15 elongates or lengthens the interval for issuing the DMA request signal (DMA REQ) or acts as a timer to adjust the time between DMA requests to be given to the priority level decision circuit 14 to adjust the data transfer speed to 1 Mbyte (1+2.5×2=6). That is, the interval (the time) between DMA requests issued by circuit 15 is effectively longer and low speed data transfer is performed. In this situation the interval between DMA requests issued by circuit 15 is effectively 4 times longer than the normal interval.

When the data transfer based on the control information of the subchannel register 8 or 9 is finished, the priority level decision circuit 14 applies a DMA transfer stop signal $S_3$ to the condition discriminating circuit 16 and indicates the control unit (2, 3) for which data transfer has finished by the ID signal $S_2$. The condition discriminating circuit 16 thereby recognizes which control unit has finished the DMA operation.

Based on the notification of completion of the DMA operation, the condition discriminating circuit 16 issues a command to the DMA request generating circuit 15 to raise the data transfer speed. The DMA request generating circuit 15 shortens the time interval for issuing the DMA request signal (DMA REQ) to the priority level decision circuit 14 and adjusts the data transfer speed to 3.5 Mbyte (3.5+2.5=6). In this situation the interval between DMA transfer requests is approximately effectively 1.14 times normal.

Furthermore, the condition discriminating circuit 16 will not send a command to lower the data transfer speed to the DMA request generating circuit when not transferring data under the control of both the subchannel registers 8 and 9, so the memory-to-memory transfer control unit 13 maintains a high data transfer speed of 4 Mbyte and the interval between DMA requests is effectively normal. If the control unit (2 or 3) corresponding to the sub channel register 8 or 9 begins data transfer and thus the priority level decision circuit 14 provides a DMA start signal $S_1$ and ID signal $S_2$, the condition discriminating circuit 16 lengthens the time interval issuing of the DMA requests by the DMA requests generating circuit 15 so that the data transfer speed becomes 3.5 Mbyte. If both the control units (2 and 3) corresponding to the subchannel registers 8 and 9 are transferring data, the time interval is adjusted so that the data transfer speed of the memory-to-memory transfer control unit 13 becomes 1 Mbyte.

Due to the above construction, the condition discriminating circuit 16 can determine the operational state of the sub channel registers 8 and 9 by supervising the signals $S_1$ and $S_2$ provided from the priority level decision circuit 14 and, in accordance with the operational state, can lengthen or shorten the time interval between DMA requests for the DMA request generating circuit 15. Therefore, the memory-to-memory transfer control unit 13 can perform automatic control to achieve the maximum data transfer capability of the DMA control unit 12. As a result, a DMA controlled system able to perform high efficiency data transfer can be realized.

Figure 3:
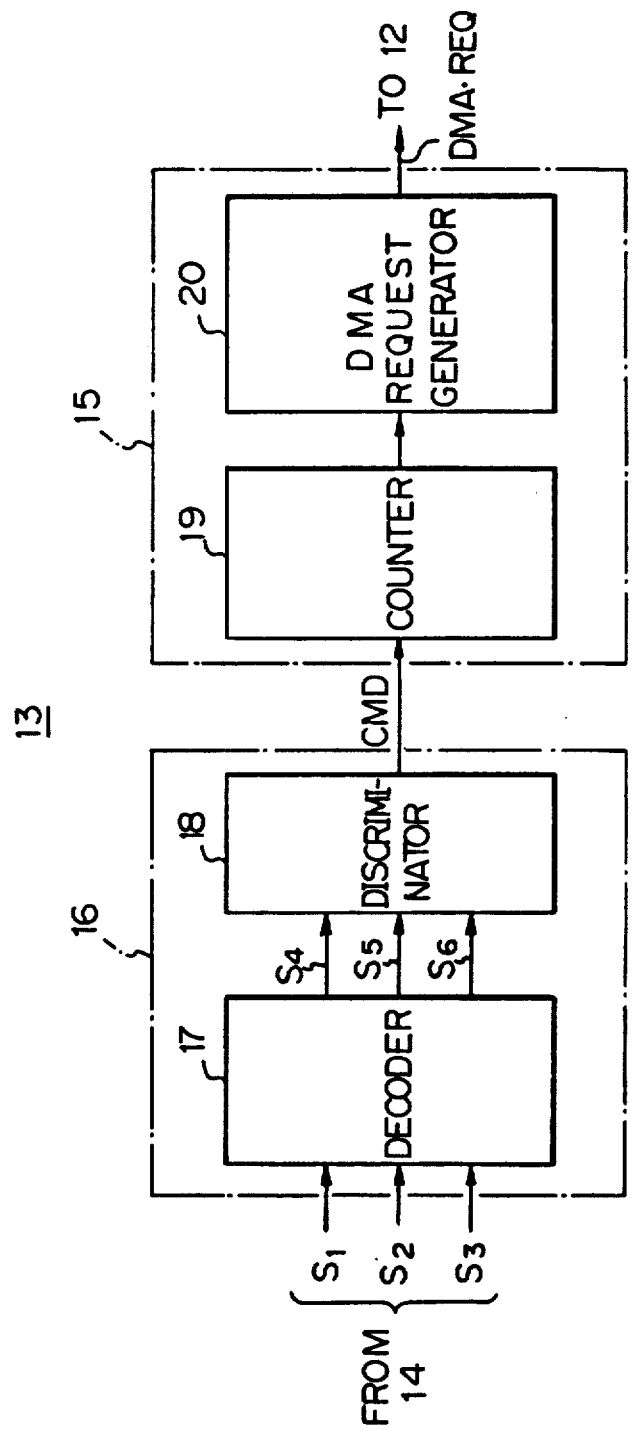
FIG. 3 is a block diagram showing an example of the memory-to-memory transfer control unit 13 according to the present invention.

FIG. 3 is a block diagram showing an example of a memory-to-memory transfer control unit according to the present invention. In FIG. 3, the memory-to-memory transfer control unit 13 comprises, as shown in FIG. 2, a DMA request generating circuit 15 and a condition discriminating circuit 16. First, the condition signals provided from the priority level decision circuit 14 (FIG. 2), i.e., the DMA start signal $S_1$, ID signal $S_2$, and DMA transfer stop signal $S_3$, are input to a decoder 17 and decoded to produce, for example, three types of decoded output signs $S_4$, $S_5$, and $S_6$. These signals $S_4$, $S_5$, and $S_6$ which indicate the current DMA lead are input to a discriminator 18. The decoder 17 and discriminator 18 comprise the condition discriminating circuit 16.

Figure 4:
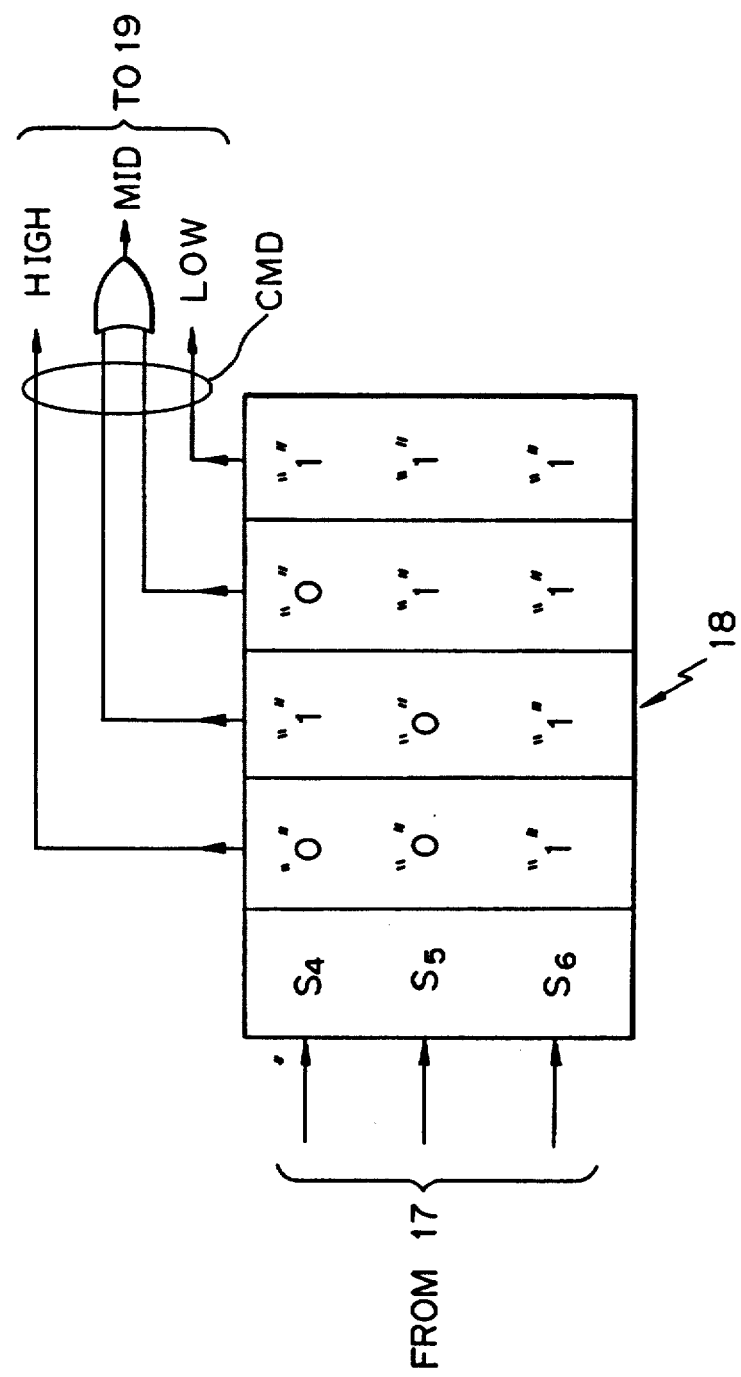
FIG. 4 is a view showing an example of discrimination logic of a discriminator 18 of FIG. 3.

FIG. 4 is a view showing an example of discrimination logic of the discriminator of FIG. 3. An explanation will be made of the operation of FIG. 3 with reference to this discrimination logic. If $S_4$="0", $S_5$="0", and $S_6$="1", the discriminator 18 issues a command CMD to the effect that the data transfer speed should be made high speed (HIGH).

The command CMD is input to a counter 19 and the output of the counter 19 controls a DMA request generator 20. The counter 19 and generator 20 comprise the DMA request generating circuit 15.

When the discriminator 18 issues a high speed command, the counter 19 counts a lower number corresponding to the high speed command and, when it finishes, indicates to or controls the DMA request generator 20 to output to the unit 12 a DMA request signal DMA REQ.

If the output signals of the decoder 17 are $S_4$="1", $S_5$="0", and $S_6$="1", the discriminator 18 issues a command CMD to the effect that the data transfer speed should be made middle speed (MID). Similarly, when $S_4$="0", $S_5$="1", and $S_6$="1", the discriminator 18 issues a middle command CMD. At this time, the counter 19 counts a number corresponding to the middle speed command and, when it finishes, indicates to or controls the DMA request generator 20 to output to the unit 12 a DMA request signal DMA REQ.

If the output signals of the decoder 17 and $S_4$="1", $S_5$=1", and $S_6$="1", the discriminator 18 issues a command CMD to the effect that the data transfer speed should be made low speed (LOW). At this time, the counter 19 counts a larger number corresponding to the low speed command and, when it finishes, controls the DMA request generator 20 to output to the unit 12 a DMA request signal DMA REQ.

Note that when the signal $S_6$ is $S_6$="0", this means no data transfer is being performed between the memory-to-memory transfer control unit 13 and the cache memory, so the discriminator 18 does not issue any command CMD to the counter 19 regardless of the "1" or "0" state of $S_4$ and $S_5$. This is because there is no need to output a DMA request signal from the memory-to-memory transfer control unit 13.

Figure 5:
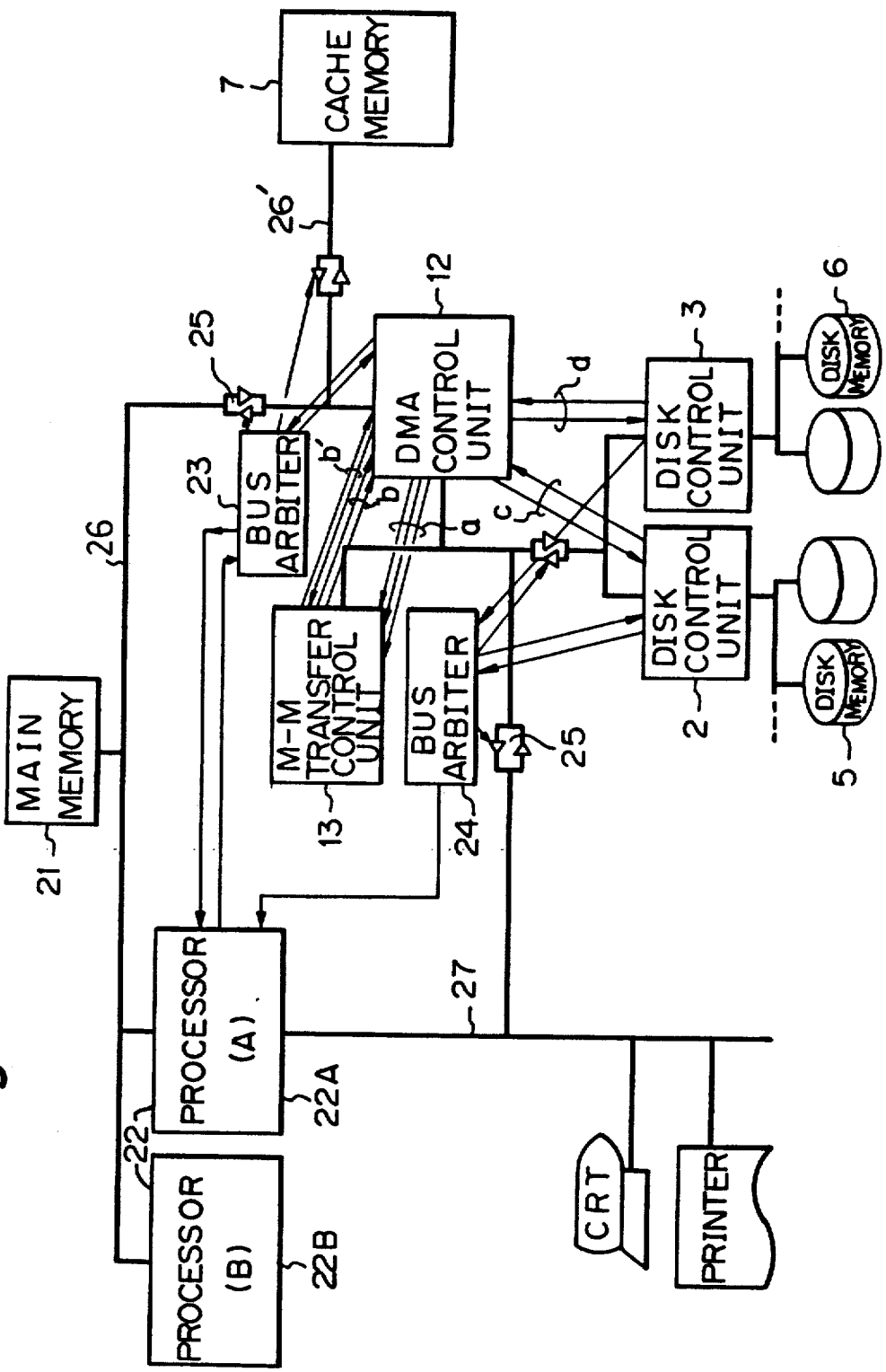
FIG. 5 is a block diagram showing a detailed example of a DMA controlled system to which the present invention is applied.

FIG. 5 is a block diagram showing a detailed example of a DMA controlled system to which the present invention is applied. Note that throughout the figures, the same elements are given the same reference numerals or symbols. In the figure, the link a and links b, b' connecting the DMA control unit 12 and memory-to-memory transfer control unit 13 are particular characteristics of the present invention. The link a is shown in FIG. 2 as well and is used for transmission of control signals $S_1$, $S_2$, and $S_3$. The link b is shown in FIG. 2 as well, but in actuality, the link b' is also used. The links c and d connect to the disk control units 2 and 3. In addition, reference numeral 21 indicates the already mentioned main memory, and 22A and 22B processors. The two processors share roles and form a combined processor in a high speed computer system. Reference numerals 23 and 24 are bus arbiters which designate the opening or closing of the two-way gates 25 and order traffic so that there is no conflict in data transmission on the memory bus 26 and input/output (I/O) bus 27.

The processor 22 operates as if to directly access the disk memories 5 and 6, but in the system of FIG. 5, the cache memory 7 has copied and stored therein the desired data in the disk memories 5 and 6 and the cache memory 7 is accessed, wherein the processor 22 can process data much faster. Note that in general a disk cache memory is provided as part of the disk memories 5 and 6, but this makes it impossible to use general-purpose disk memories, so is disadvantageous economically. The point of the present invention is to make the DMA transfer speed between the main memory 21 and the cache memory 7 in FIG. 5 variable.

First, when the DMA mode starts, the processor 22 writes the DMA control information in the corresponding sub channel registers (8, 9, 10, 10b; 10b relating to the previously mentioned link b') in the DMA control unit 12. At this time, the bus arbiter 24 supervises the address of the I/O bus 27 and if it is the address for the DMA control unit 12 or the disk control unit 2 or 3, drives the receiver side of the two-way gate 25.

Next, the processor 22 writes the address in the disk sector register (shown by 111 in FIG. 10) in the disk control unit 2 or 3. This address indicates the position of the desired data in the disk memory.

The processor 22 displays the DMA start flag (register 112 in FIG. 10) in the disk control unit 2 or 3.

The disk control unit 2 or 3 outputs to the DMA control unit 12 a DMA request signal DMA REQ (FIG. 2).

The disk control unit 2 or 3 sends to the bus arbiter 24 a signal requesting the use of the I/O bus 27.

When a response to the DMA REQ, i.e., a DMA acknowledge signal DMA ACK, is returned from the DMA control unit 12, data begins to be read by the disk memory. Further, data is transferred from the disk control unit 2 or 3 to the DMA control unit 12.

The DMA control unit 12 sends to the bus arbiter 23 a signal requesting use of the memory bus 26'. When a response to the request for use is returned, the DMA control unit 12 writes data in the cache memory 7.

Further, the DMA control unit 12 outputs a request for use of the memory bus 26 to the bus arbiter 23 and transfers data from the cache memory 7 to the main memory 21 under the control of the memory-to-memory transfer control unit 13. The point of the present invention is how to issue the DMA request under the control of the memory-to-memory transfer control unit 13.

Figure 6:
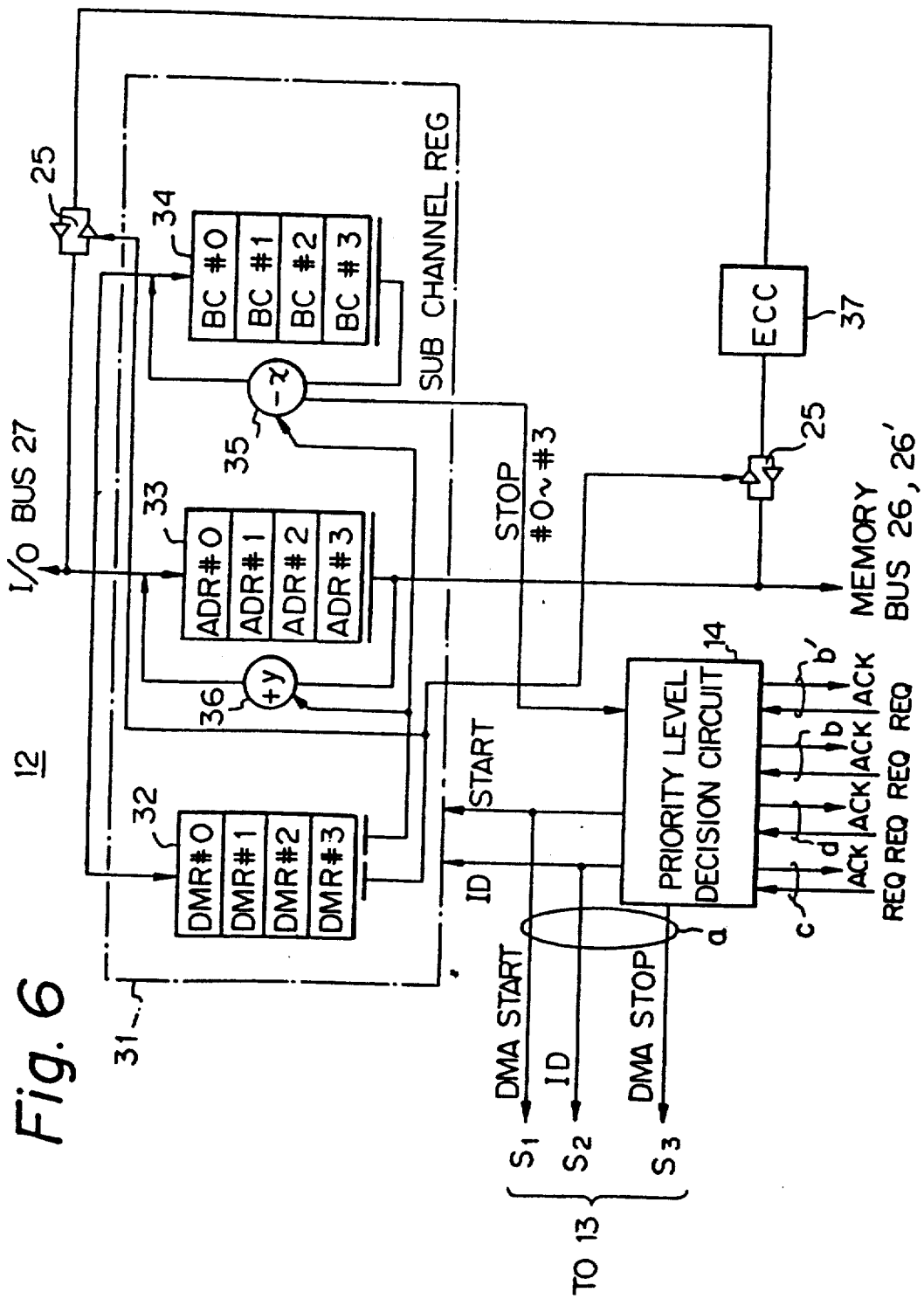
FIG. 6 is a circuit diagram showing a specific example of a DMA control unit.

FIG. 6 is a circuit diagram showing a specific example of the DMA control unit. In the figure, the subchannel register 31 comprises all together #0 to #2 registers (corresponding to 8, 9, and 10 in FIG. 2) and a #3 register (register 10b forming a pair with subchannel register 10). More specifically, it is comprised of DMA mode registers (DMR), address registers (ADR) 33, and byte counters (BC) 34. The DMR's 32 have written in them the DMA direction, the first transferred byte number, and the DMA start flag from the processor 22 through the I/O bus 27. The ADR's 33 have written in them the address of the memory bus 26 or 26' from the processor 22. Further, the BC's 34 have displayed therein the number of remaining transfer bytes. A subtractor 35 is provided for displaying the remainder, which subtractor 35 subtracts with each transfer using the number of transferred bytes recorded in the DMR 32 (in the figure, shown by −x). When the subtraction finally brings the content of BC to zero, the transfer stops and the signal of stop #0 to #3 is applied to the priority level decision circuit.

The address register (ADR) 33 designates the head or beginning address of the data for which the next transfer is next to begin, with each end of a transfer. For this, an adder 36 is provided, which adds the number of transferred bytes recorded in the DMR 32 (in the figure, indicated by +y).

The above-mentioned subchannel register #3 (corresponding to 10b) in actuality is required for storage in a buffer memory (not shown), in the memory-to-memory transfer control unit 13 (FIG. 5), data transferred from the cache memory 7 to the main memory 21 for the purpose of error correction. Note that an error correction circuit for the above-mentioned error correction is shown in FIG. 6 as ECC 37.

Figure 7:
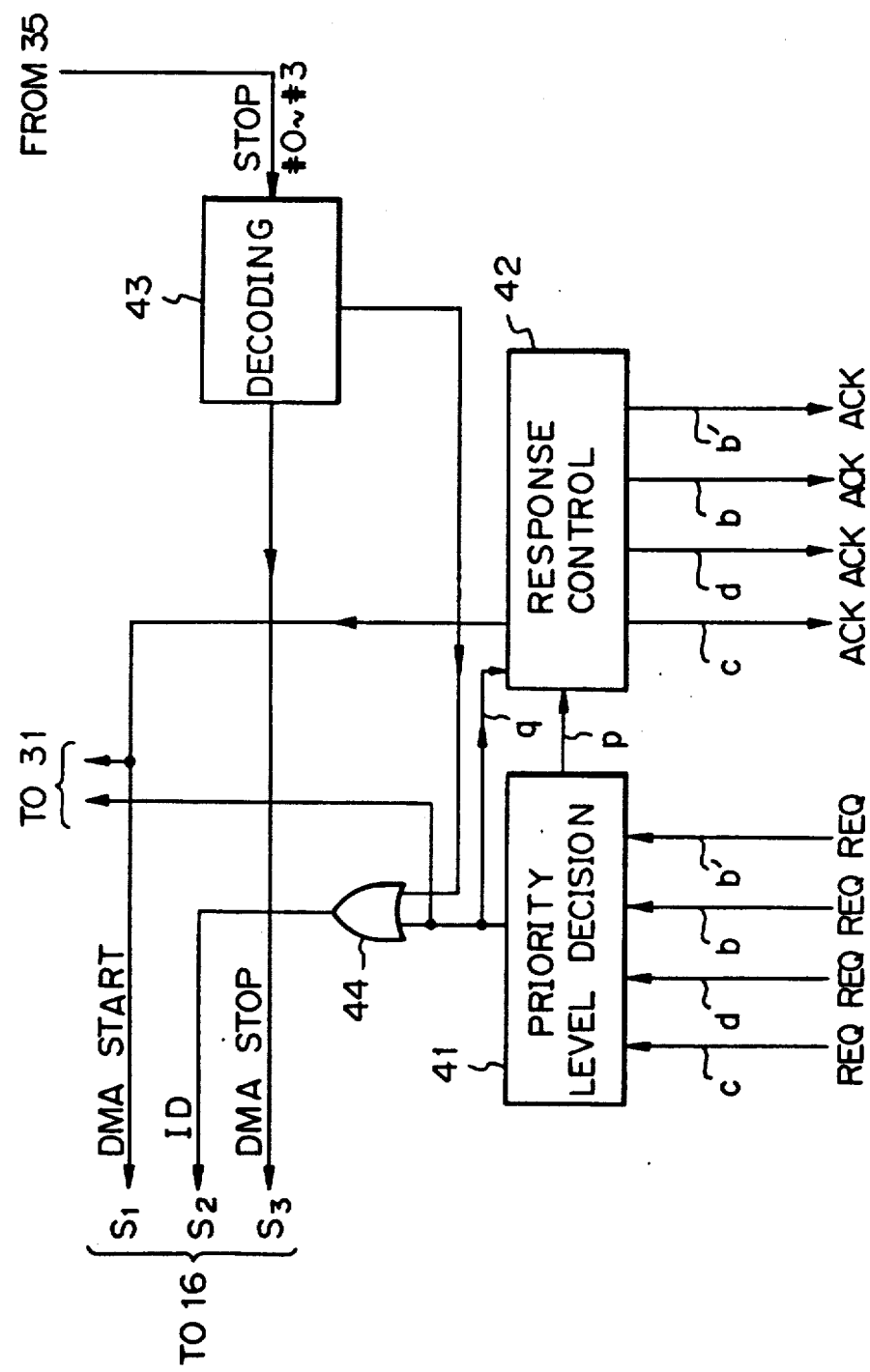
FIG. 7 is a block diagram showing a specific example of a priority level decision circuit.

FIG. 7 is a block diagram showing a specific example of a priority level decision circuit 14 and is a more detailed view of the block 14 in FIG. 6. The priority level decision circuit 14, as shown, is comprised of priority level decision logic 41, response control circuit 42, decoding circuit 43, and OR gate 44. The priority level decision logic 41 receives a DMA request signal DMA REQ from the previously mentioned links c, d, b, and b' and receives on a priority basis the request of the predetermined highest priority. Note that the logic for determination of the priority is known and will not be explained in detail.

For example, when the logic 41 receives a DMA request from the link c, the signal is applied through the line p to the response control circuit 42, the circuit 42 is drive, and an acknowledge signal ACK is generated. On which link the ACK is returned is designated by the line q. On the line q, the ID of the received link, i.e., "c", appears. Based on this, "c" the circuit 42 returns ACK to the link c. In this way the disk control unit 2 (FIG. 5) starts DMA transfer of the read data from the disk memory. That is, the circuit 42 applies a DMA start signal to the subchannel register 31 on the one hand, while, on the other hand, the DMA start signal is provided as the control signal $S_1$ to the condition discriminating circuit 16 (FIGS. 2 and 3) in the memory-to-memory transfer control unit 13. The circuit 13 is also provided with a control signal $S_2$ showing the above-mentioned ID.

When the apparatus which has already executed the DMA transfer, for example, the disk control unit 3 (FIG. 5), finishes the transfer of the predetermined data, a stop #1 signal is sent from the subtractor 35 (FIG. 6) to the priority level decision circuit 14. This stop #1 is received by the decoding circuit 43, whereupon the apparatus sending the DMA stop signal is decoded. In this case, the ID of the DMA stop signal shows the link d, that is, the disk control unit 3. This ID, i.e., "d", is provided to the above-mentioned condition discriminating circuit 16 in the memory-to-memory transfer control unit 13 through the OR gate as ID signal $S_2$.

Figure 8:
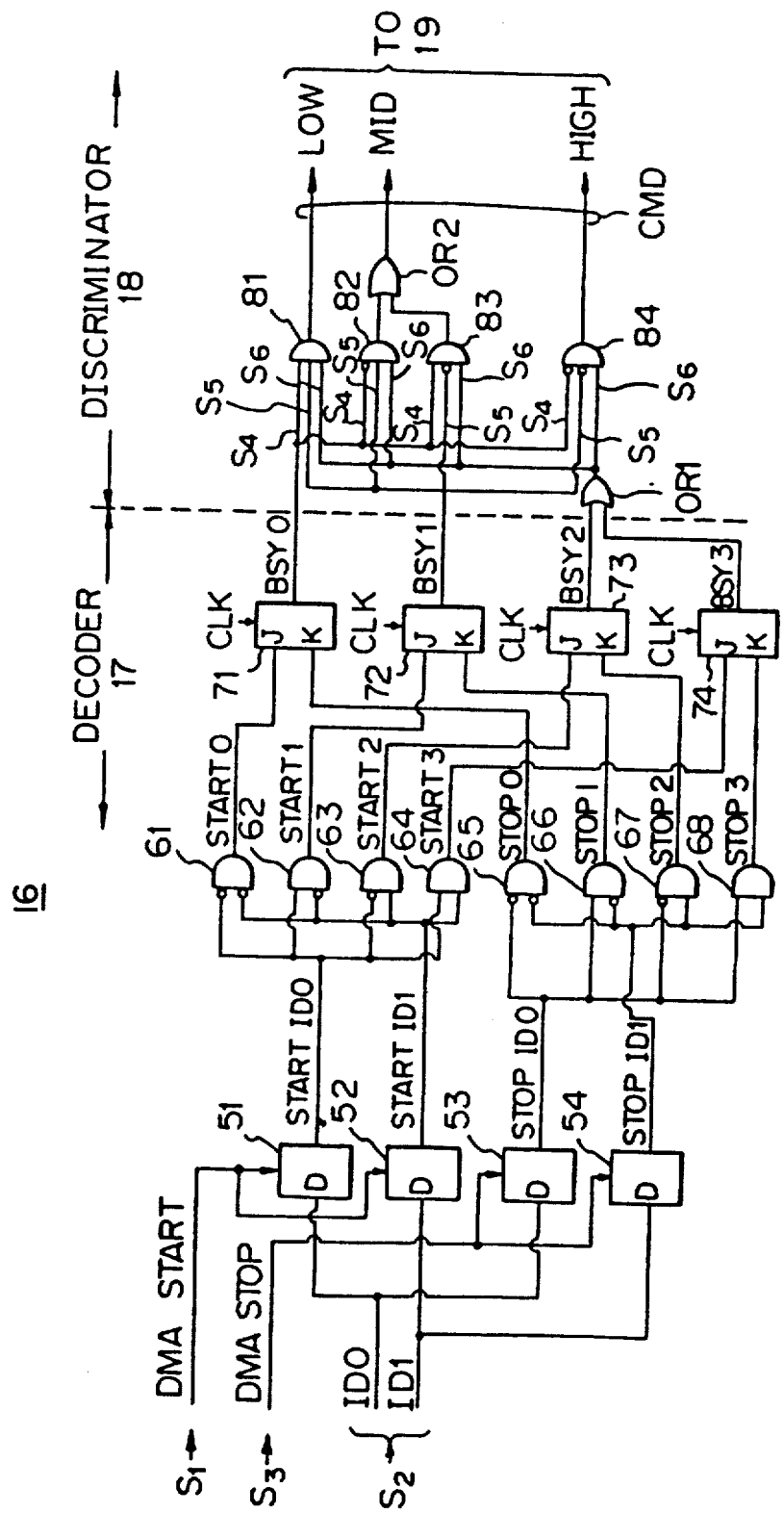
FIG. 8 is a circuit diagram showing a specific example of a condition discriminating circuit.

FIG. 8 is a circuit diagram showing a specific example of a condition discriminating circuit. This condition discriminating circuit 16, as explained with respect to FIG. 3, may be broken down into a decoder 17 and discriminator 18. Further, $S_1$, $S_2$, and $S_3$, $S_4$, $S_5$, and $S_6$, and command CMD appear in the apparatus shown in FIG. 8.

The ID signal discriminates between the subchannel registers #0 to #3 and can discriminate between them using 2 bits (D10, D11). That is, see the following Table I.

TABLE I

| DI0 | DI1 | Sub channel (31) | Link |
|-----|-----|------------------|------|
| 0   | 0   | #0               | c    |
| 0   | 1   | #1               | d    |
| 1   | 0   | #2               | b    |
| 1   | 1   | #3               | b'   |

Receiving the ID signals (ID0 and ID1) are the D flip-flops (D FF) 51 to 54. The outputs of D FF 51 and 52 indicate the ID when a DMA start is issued (START ID0, START ID1), while the outputs of D FF 53 and 54 indicate the ID when a DMA stop is issued (STOP ID0, STOP ID1).

These signals START ID0, ID1 and STOP ID0, ID1 are input to the AND gates 61 to 68 of the next stage. The inputs of the AND gates 61 to 64 are provided with inverters in differing combinations. The AND gates 61-64 output on whcih subchannel (#0 to #3) the DMA has started (START 0 to START 3). On the other hand, the inputs of the AND gates 65 to 68 are provided with inverters in differing combinations, and the AND gates 65-68 outputs indicate on which subchannel (#0 to #3) the DMA has stopped (STOP 0 to STOP 3).

These signals START 0 to START 3 and STOP 0 to STOP 3 are input to the JK flip-flop (JK FF) of the next stage. The JK FF's have an FF output of "1" when the J-input is "1" and are reset when the K-input becomes "1". Therefore, the outputs of the JK FF's 71 to 74 become signals BSY0 to BSY3 which show which sub channel is busy. The signals BSY0 to BSY3 form the previously mentioned decoded output signals $S_4$, $S_5$, and $S_6$. Note that the signal $S_6$ is the OR'ed version of BSY2 and BSY3 and therefore an OR gate OR1 is provided. This is because BSY2 and BSY3 never simultaneously become "1".

The signals $S_4$ to $S_6$ are input to the AND gates 81 to 84 in the discriminator 18. The inputs of the AND gates 81 to 84 are provided with inverters in differing combinations. The discrimination shown in FIG. 4 is achieved by simple logic. Note that the OR gate in FIG. 4 (outputting the MID speed command) corresponds to the OR gate OR2 in FIG. 8. Therefore, the high speed command HIGH, middle speed command MID, and low speed command LOW are issued and applied to the counter (19 in FIG. 3). Note that two different types of middle speed commands, such as MID1 and MID2, may be issued from the outputs of the AND gates 82 and 83. The following Table II shows an example of the correspondence between the logic pattern of the busy signals BSY0 to BSY3 and the speed command (CMD).

TABLE II

| BSY | | | | CMD | |
|---|---|---|---|---|---|
| 0 | 1 | 2 | 3 | | |
| 0 | 0 | 0 | 1 | HIGH | |
| | | or | | | |
| | | 1 | 0 | | |
| 0 | 1 | 0 | 1 | MID1 | |
| | | or | | | MID |
| | | 1 | 0 | | |
| 1 | 0 | 0 | 1 | MID2 | |
| | | or | | | |
| | | 1 | 0 | | |
| 1 | 1 | 0 | 1 | LOW | |

TABLE II-continued

| BSY | CMD |
|-----|-----|
| or  |     |
| 1   | 0   |

Figure 9:
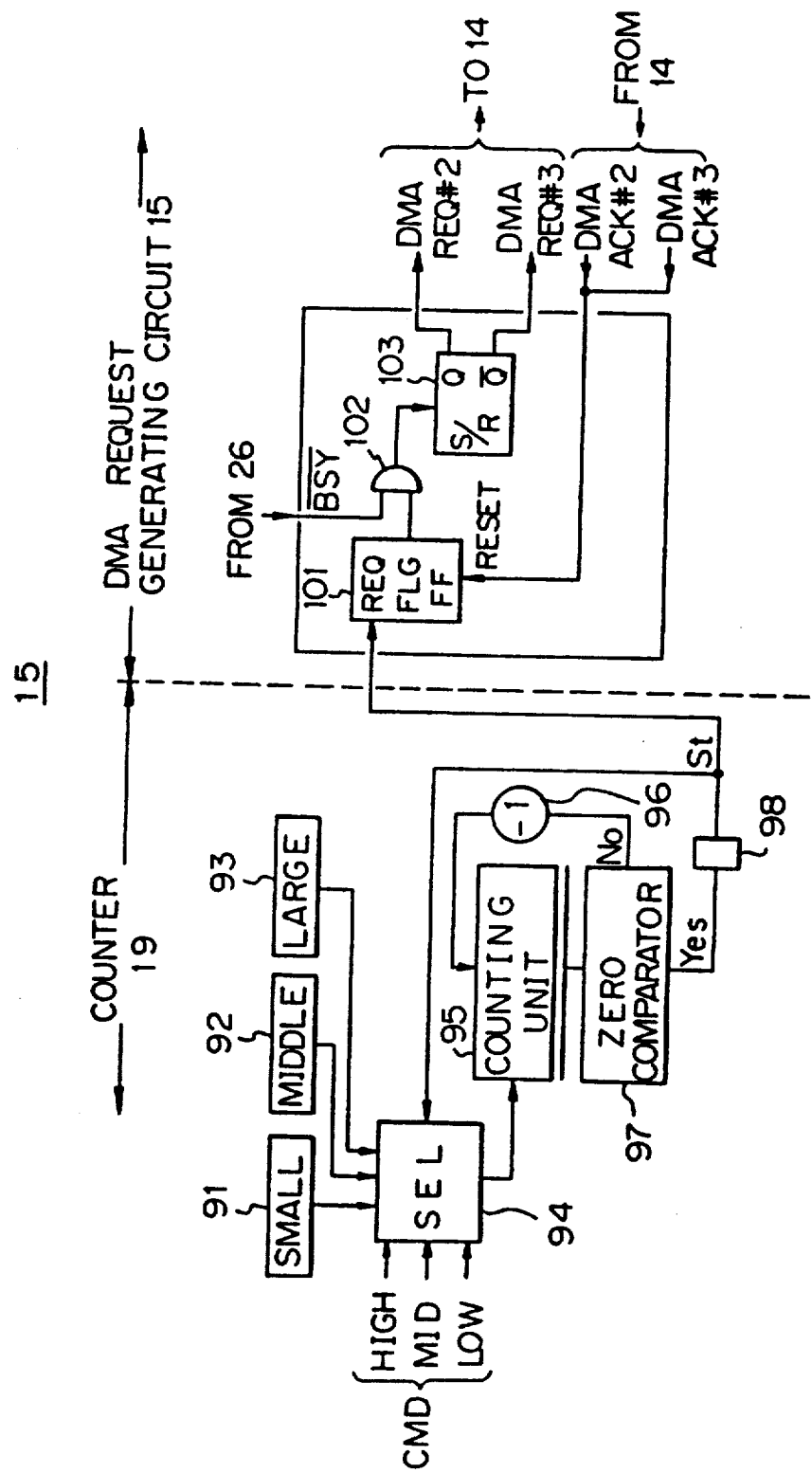
FIG. 9 is a circuit diagram showing a specific example of a DMA request generating circuit.

FIG. 9 is a circuit diagram showing a specific example of a DMA request generating circuit. This DMA request generating circuit 15 may be largely broken down into a counter 19 and DMA request generator 20 as explained in FIg. 3. It receives as an input the speed command CMD shown in FIG. 3 (also shown in FIG. 4 and FIG. 8) and outputs a DMA request signal DMA REQ corresponding to the command.

The counter 19 has a counting unit 95, which functions as a down counter using a subtractor 96. The down counter has a count number initially preset and is supplied with preset numbers from first, second, and third presetters 91, 92, and 93, e.g., so-called dip switches. The presetters 91, 92, and 93 supply small, middle, and large preset numbers respectively. Which preset number is selected is determined in accordance with which of the high, middle, and low speed commands (CMD) is issued. The selection is performed by a selector (SEL) 94.

Whether the count of the counting unit 95 is zero is detected by a zero comparator 97. If not zero (NO), the count operation is continued. When zero is reached (YES), a trigger signal St is issued and output to the DMA request generating circuit 20, simultaneous with which the selector 94 is cleared. the trigger signal St may be obtained via a differentiating circuit (D) 98. The circuit 98 is necessary since the correct DMA request signal cannot be generated if the output of the zero comparator 97 continues forever to be applied to the circuit 20 of the next stage.

The trigger signal St is input to a DMA request flag flip-flop (REQ FLG FF) 101 and sets the DMA request flag. The DMA request flag is only set at time intervals corresponding to the speed commands (HIGH, MID, and LOW). When the flag is set, a DMA request signal DMA REQ #2 or DMA REQ #3 is sent, via an AND means 102 and SR flip-flop (S/R) 103, to the priority level decision circuit 14 in the DMA control unit 12 (FIGS. 2, 6, and 7). When the circuit 14 receives the DMA request, DMA ACK #2 or DMA ACK #3 is returned, whereby the DMA request flag is reset and the next DMA request can be received.

If the memory bus 26 is in a non-use stage, DMA transfer cannot be executed, so it is necessary to check to see if the memory bus 26 is idle. Therefore, the AND means 102 is provided. The AND means 102 opens when a bus idle signal BSY is received from the bus arbiter 23 and applies the DMA request flag to the SR FF 103. Note that the AND means 102 can be realized by software or hardware.

The DMA REQ #2 and DMA REQ #3 correspond to the DMA data transfer to the cache memory 7 and the DMA data transfer from the memory-to-memory transfer control unit 13 (FIG. 5) and correspond to the subchannel registers #2 and #3. Therefore, DMA REQ #2 and #3 must be prohibited from existing simultaneously. For this, the SR FF 103 is provided so that DMA REQ #2 and #3 are output complementarily from the set side and reset side.

Figure 10:
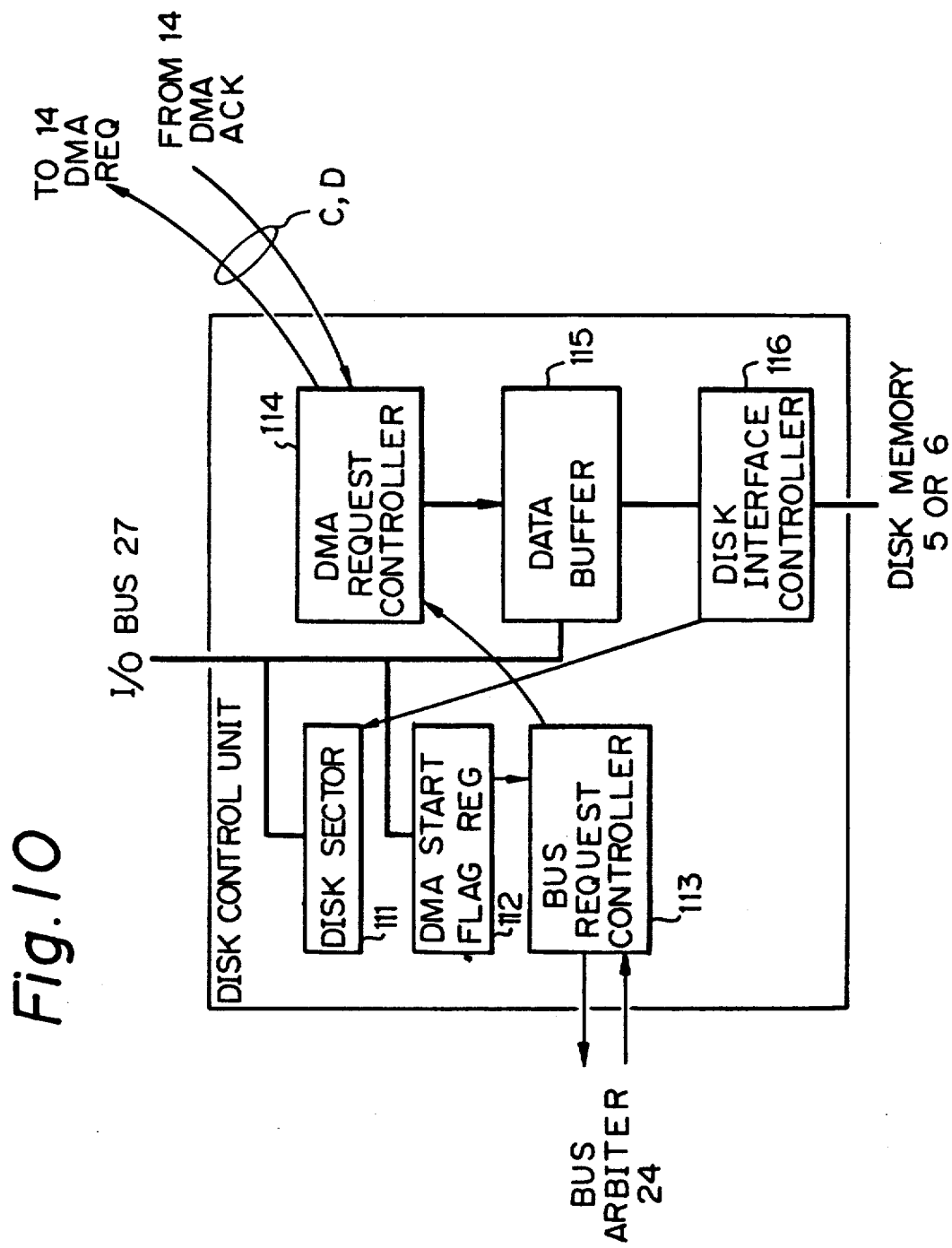
FIG. 10 is a block diagram showing a specific example of a disk control unit.

FIG. 10 is a block diagram showing a specific example of a disk control unit. The disk control units 2 and 3 are constructed identically. The disk sector register 111 in the figure has already been explained with reference to FIG. 5. The disk sector register 111 stores the address which determines from which disk memory 5 or 6 to read and cooperates with the disk interface controller 116 as well. The controller 116 is connected to the data buffer 115. When the I/O bus 27 is busy and data read from the disk memory cannot be fed to the bus, the data is stored temporarily in the buffer 115. Whether or not the I/O bus 27 is busy or idle is determined from the interrelation with the bus arbiter 24. For this, a bus request controller 113 is provided.

When a request for data transfer is issued in the form of DMA REQ to the priority level decision circuit in the DMA control unit 12 and DMA ACK is returned, the DMA transfer starts. In this case, a command to start the DMA transfer is first set from the processor 22 through the I/O bus 27 in the DMA start flag register 112. By this setting, the bus request controller 113 confirms the occupancy of the I/O bus. If occupancy is possible, the DMA REQ is issued.

As mentioned above, according to the present invention, the DMA data transfer between the main memory and submemory, i.e., cache memory, is made variable in speed. Further, the transfer speed is made selectable in accordance with the load state of the other auxiliary memories of the DMA control unit, i.e., the disk memories. Therefore, the DMA controlled system is given an overall improved data transfer efficiency.

We claim:

1. A DMA controlled system, comprising:

a processor;

a main memory connected to said processor and storing data for said processor;

a submemory;

a memory-to-memory transfer control unit connected to said submemory, which controls data transfer between said main memory and said submemory, and operated with a variable effective data transfer speed;

auxiliary memories;

auxiliary control units connected to said auxiliary memories, which control data transfer between said submemory and said auxiliary memories over a subchannel, and operated at a constant data transfer speed; and a DMA control unit connected between said main memory and said auxiliary control units and transferring the data between said main memory and said auxiliary control units, connected between said main memory and said memory-to-memory transfer control unit and transferring the data between said main memory and said memory-to-memory transfer control unit, which interacts with said memory-to-memory transfer control unit and said auxiliary control units to control a direct memory access (DMA) data transfer, and said DMA control unit having a DMA transfer capacity;

wherein said DMA control unit comprises priority level decision means for providing condition signals indicating whether said auxiliary memories are operating to perform data transfer according to a status of said subchannel determined by said auxiliary control units, when said auxiliary memories are operating said DMA control unit having a marginal transfer capacity equal to the DMA transfer capacity less a sum of the data transfer speed of the operating auxiliary memories;

wherein said memory-to-memory transfer control unit comprising:
  a condition discriminating means for determining a data transfer speed of said memory-to-memory transfer control unit according to said condition signals and issuing speed specifying commands; and
  DMA request generating means for providing a variable time interval between issuing DMA request signals output to said DMA control unit according to the speed specifying commands issued from said condition discriminating means; and
wherein when said auxiliary control units are operating and the marginal transfer capacity of said DMA control unit changes, said condition discriminating means changes the effective data transfer speed of said memory-to-memory transfer control unit to conform with said decreased marginal transfer capacity by changing the variable time interval between DMA request signals responsive to congestion of DMA transfers by said auxiliary control units.

2. A system according to claim 1, wherein said submemory comprises a cache memory and said auxiliary memories comprise disk memories.

3. A system according to claim 2, wherein said priority level decision means provides at least three types of condition signals, a first condition signal being a DMA start signal, a second condition signal being an identification (ID) signal, and a third condition signal being a DMA stop signal, and ID signal indicating a number of a subchannel register for which DMA has started or a number of a subchannel register for which DMA has stopped.

4. A DMA controlled system, comprising:
a processor;
a main memory connected to said processor and storing data for said processor;
a submemory;
a memory-to-memory transfer control unit connected to said submemory, which controls data transfer between said main memory and said submemory, and operated with a variable effective data transfer speed;
auxiliary memories;
auxiliary control units connected to said auxiliary memories, which controls data transfer between said submemory and said auxiliary memories over a subchannel, and operated at a constant data transfer speed; and
a DMA control unit connected between said main memory and said auxiliary control units and transferring the data between said main memory and said auxiliary control units, connected between said main memory and said memory-to-memory transfer control unit and transferring the data between said main memory and said memory-to-memory transfer control unit, which interacts with said memory-to-memory transfer control unit and said auxiliary control units to control a direct memory access (DMA) data transfer, and said DMA control unit having a DMA transfer capacity;
wherein said DMA control unit comprises priority level decision means for providing condition signals indicating whether said auxiliary memories are operating to perform data transfer according to a status for said subchannel determined by said auxiliary control units, when said auxiliary memories are operating said DMA control unit having a marginal transfer capacity equal to the DMA transfer capacity less a sum of the data transfer speed of the operating auxiliary memories;
wherein said memory-to-memory transfer control unit comprising:
  condition discriminating means for determining a data transfer speed of said memory-to-memory transfer control unit according to said condition signals and issuing speed specifying commands; and
  DMA request generating means for providing a variable time interval between issuing DMA request signals output to said DMA control unit according to the speed specifying commands issued from said condition discriminating means;
wherein when said auxiliary control units are operating and the marginal transfer capacity of said DMA control unit change said condition discriminating means changes the effective data transfer speed of said memory-to-memory transfer control unit is changed to conform with said decreased marginal transfer capacity by changing the variable time interval between DMA request signals responsive to combination of DAM transfers by said auxiliary control units wherein said submemory comprises a cache memory and said auxiliary memories comprise disk memories;
wherein said priority level decision means provides at least three types of condition signals, a first condition signal being a DMA start signal, a second condition signal being an identification (ID) signal, and a third condition signal being a DMA stop signal, said ID signal indicating a number of a subchannel register for which DMA has started or a number of a subchannel register for which DMA has stopped; and
wherein said condition discriminating means comprising:
  a decoder connected to said decision means and which receives an input said DMA start signal, ID signal, and DMA stop signal, and produces decoded output signals consisting of a plurality of bits; and
  a discriminator connected to said decoder and which receives an input the plurality of bits from said decoder and selects a corresponding one of at least a high speed command, middle speed command, and low speed command.

5. A system according to claim 4, wherein said DMA request generating means comprises:
  a counter coupled to said discriminator and which counts a large, middle, and small (including zero) count number responsive to one of said high speed, middle speed, and low speed commands; and
  a DMA request generator connected to said counter and which outputs to said DMA control unit a DMA request signal having a small, middle, and large time interval according to said small, middle, and large count number, respectively.

6. A system according to claim 5, wherein said counter comprises:
presetters which supply said large, middle, and small count numbers to be preset in said counting unit;
a selector connected to said presetters and said discriminator AND gates and which selects one of the outputs of said presetters according to one of said high, middle, and low speed commands for presetting said counting unit;
a zero comparator connected to said counting unit and which detects whether the count number of said counting unit has reached zero and allows said down count to continue until zero is reached; and
a differentiating circuit connected to said zero comparator and which differentiates said zero comparator output to generate a trigger signal when said count number reaches zero.

7. A system according to claim 6, wherein said DMA request generating circuit comprises:
a flag flip-flop connected to said differentiating circuit and which receives said trigger signal to set the DMA request flag;
AND means, connected to said flag flip-flop for, confirming that a memory bus on which data transfer is to be made based on said DMA request is not being used and then passes said DMA request flag; and
an RS flip-flop, connected to said AND means and said priority level decision circuit, which complementarily sends to said priority level decision circuit two DMA request signals according to the DMA request flag passing through said AND means, said two DMA request signals indicating data transfer from said cache memory and data transfer to the cache memory, and said flag flip-flop being reset by each DMA acknowledge signal returned from said priority level decision circuit in response to each said DMA request signal.

8. A system according to claim 7, wherein said AND means indicates whether said memory bus is not being used by a bus arbiter.

9. A system according to claim 4, wherein said decoder comprises:
two start D flip-flops connected to said response control circuit and said decoding circuit and which receive commonly at each D-input said DMA start signal and which receive separately the identification (ID) signal;
two step D flip-flops connected to said decoding circuit and which receive commonly at each D-input said DMA stop signal and which receive separately the identification (ID) signal;
start AND gates connected to said start D flip-flop and which determine from the outputs of said two start D flip-flops which memory control unit the DMA start signal is from;
stop AND gates connected to said stop D flip-flops and which determine from outputs of said two stop D flip-flops which memory control unit the DMA stop signal is from; and
JK flip-flops connected to said stop and start AND gates and which receive as J-inputs outputs from said start AND gates and receive as K-inputs outputs from said stop AND gates, and outputs of said JK flip-flops being used as said decoded output signals.

10. A system according to claim 9, wherein said discriminator comprises discriminator AND gates connected to said JK flip-flops and which receive as inputs said decoded output signals and open only when a bit pattern is matched, said AND gates being at least three AND gates which output said high speed, middle speed, and low speed commands.

11. A DMA controlled system, comprising:
a processor;
a main memory connected to said processor and storing data for said processor;
a submemory;
a memory-to-memory transfer control unit connected to said submemory, which controls data transfer between said main memory and said submemory, and operated with a variable effective data transfer speed;
auxiliary memories;
auxiliary control units connected to said auxiliary memories, which controls data transfer between said submemory and said auxiliary memories over a subchannel, and operated at a constant data transfer speed; and
a DMA control unit connected between said main memory and said auxiliary control units and transferring the data between said main memory and said auxiliary control units, connected between said main memory and said memory-to-memory control units and transferring the data between said main memory and said memory-to-memory transfer control units, which interacts with said memory-to-memory transfer control unit and said auxiliary control units to control a direct memory access (DMA) data transfer, and said DMA control unit having a DMA transfer capacity;
wherein said DMA control unit comprises priority level decision means for providing condition signals indicating whether said auxiliary memories are operating to perform data transfer according to a status of said subchannel determined by said auxiliary control units, when said auxiliary memories are operating said DMA control unit having a marginal transfer capacity equal to the DMA transfer capacity less a sum of the data transfer speed of the operating auxiliary memories;
wherein said memory-to-memory transfer control unit comprising:
condition discriminating means for determining a data transfer speed of said memory-to-memory transfer control unit according to said conditions signals and issuing speed specifying commands; and
DMA request generating means for providing a variable time interval between issuing DMA request signals output to said DMA control unit according to the speed specifying commands issued from said condition discriminating means;
wherein when said auxiliary control units are operating and the marginal transfer capacity of said DMA control unit change said condition discriminating means changes the effective data transfer speed of said memory-to-memory transfer control unit is changed to conform with said decreased marginal transfer capacity by changing the variable time interval between DMA request signals responsive to combination of DAM transfers by said auxiliary control units wherein said submemory comprises a cache memory and said auxiliary memories comprise disk memories;
wherein said priority level decision means provides at least three types of condition signals, a first condition signal being a DMA start signal, a second condition signal being an identification (ID) signal, and a third condition signal being a DMA stop signal, said ID signal indicating a number of a subchannel register for which DMA has started or a number of a subchannel register for which DMA has stopped; and wherein said priority level decision means comprising:

priority level decision logic which receives DMA request signals, selects a request with a high priority, and outputs said identification (ID) signal for discriminating the selected memory and outputs a receipt signal showing receipt of the request;

a response control circuit which, when said receipt signal and identification signal are received, returns a DMA acknowledge signal tot he auxiliary control unit which issued said DMA request and further issues said DMA start signal;

a decoding circuit which, when the memory control unit which issued said DMA request finishes the DMA data transfer, issues said DMA stop signal and further outputs an identification (ID) signal identifying the memory control unit; and an OR gate for OR'ing an identification (ID) signal corresponding to said DMA start signal output and identification (ID) signal corresponding to said DMA stop signal output.

12. A system according to claim 11, wherein said DMA control unit includes a subchannel register, connected to said response control circuit and said decoding circuit, which receives said DMA start signal and identification (ID) signal and forms control information, said subchannel register applying a detection signal to said decoding circuit when completion of each DMA data transfer is detected and causing to be output said identification (ID) signal from said decoding circuit.

13. A direct memory access control system, comprising:

a main memory;

an auxiliary memory;

a submemory;

an auxiliary memory control unit connected to said auxiliary memory, controlling data storage in said auxiliary memory and having an auxiliary transfer capacity when active;

a direct memory access control unit, connected to said main memory and said auxiliary memory control unit, performing data transfers between said main memory and said auxiliary memory control unit and between said main memory and said submemory, having a transfer capacity and a marginal transfer capacity equal to the transfer capacity less the auxiliary transfer capacity when said auxiliary memory control unit is active; and a memory to memory transfer control unit, connected between said submemory and said direct memory access control unit, and including means for varying data transfer speed of said memory to memory transfer control unit of data transfers between said submemory and said main memory through said direct memory access control unit responsive to the marginal transfer capacity to adjust data transfer through said direct memory access control unit to equal the transfer capacity.

14. A system as recited in claim 13, wherein said means for varying data transfer speed comprises a timer for adjusting a time between direct memory access requests sent to said direct memory access control unit by said memory to memory transfer control unit responsive to the current load.

* * * * *

UNITED STATES PATENT AND TRADEMARK OFFICE
CERTIFICATE OF CORRECTION

PATENT NO. : 5,016,165

DATED : May 14, 1991

INVENTOR(S) : Akinao Tanikawa et al.

It is certified that error appears in the above-identified patent and that said Letters Patent is hereby corrected as shown below:

Col. 1, line 32, "(CP + $CP_{mm}$)" s/b --($CP_{dk}$ + $CP_{mm}$);

line 44, after "detail" insert a comma.

Col. 2, line 64, "11," s/b --11--, and after "1" insert a comma.

Col. 3, line 10, delete "and";

line 14, "would exceed" s/b --exceeds--;

line 47, "(4 Mbyte)" s/b --(4 Mbyte),--;

line 61, "4" s/b --14--.

UNITED STATES PATENT AND TRADEMARK OFFICE
CERTIFICATE OF CORRECTION

PATENT NO. : 5,016,165

DATED : May 14, 1991

INVENTOR(S) : Akinao Tanikawa et al.

It is certified that error appears in the above-identified patent and that said Letters Patent is hereby corrected as shown below:

Col. 4, line 10, after "and" insert --a--;
line 11, after "situation" insert a comma;
line 29, after "situation" insert a comma;
line 40, "sub channel" s/b --subchannel--;
line 44, delete "requests" (second occurrence);
line 53, "sub channel" s/b --subchannel--.

UNITED STATES PATENT AND TRADEMARK OFFICE
CERTIFICATE OF CORRECTION

PATENT NO. : 5,016,165

DATED : May 14, 1991

INVENTOR(S) : Akinao Tanikawa et al.

It is certified that error appears in the above-identified patent and that said Letters Patent is hereby corrected as shown below:

Col. 5,    line 6, "lead" s/b --load--.

Col. 6,    line 19, "sub channel" s/b --subchannel--.

Col. 7,    line 8, delete "next".

Col. 8,    line 22, "whcih" s/b --which--.

Col. 13,    line 42, "step" s/b --stop--;
line 47, delete "the".

Col. 15,    line 14, "tot he" s/b --to the--;
line 34, delete "be".

Signed and Sealed this

Twenty-second Day of December, 1992

Attest:

DOUGLAS B. COMER

*Attesting Officer*      *Acting Commissioner of Patents and Trademarks*